United States Patent [19]
Bullock et al.

[11] Patent Number: 5,143,806
[45] Date of Patent: Sep. 1, 1992

[54] PROCESS FOR FORMING BARIUM METAPLUMBATE

[75] Inventors: Norma K. Bullock, Pewaukee; Wen-Hong Kao, Brown Deer, both of Wis.

[73] Assignee: Globe-Union Inc., Milwaukee, Wis.

[21] Appl. No.: 676,845

[22] Filed: Mar. 28, 1991

Related U.S. Application Data

[63] Continuation-in-part of Ser. No. 345,993, May 2, 1989.

[51] Int. Cl.[5] .............................................. H01M 4/56
[52] U.S. Cl. ................................ 429/228; 427/383.7
[58] Field of Search .................. 427/343, 376.3, 376.2, 427/383.7; 429/225, 228

[56] References Cited

U.S. PATENT DOCUMENTS

| | | | |
|---|---|---|---|
| 2,159,226 | 5/1939 | Reid . | |
| 2,658,097 | 11/1953 | Orsino . | |
| 3,374,185 | 3/1968 | Nitta et al. | 252/521 |
| 3,932,315 | 1/1976 | Sleight . | |
| 4,352,899 | 10/1982 | Tada . | |
| 4,470,898 | 9/1984 | Penneck et al. . | |
| 4,656,706 | 4/1987 | Mahato . | |
| 4,731,261 | 3/1988 | Tsuchitani et al. | 427/376.5 |
| 4,761,711 | 8/1988 | Hiremuth . | |
| 5,045,170 | 9/1991 | Bullock et al. | 204/280 |

FOREIGN PATENT DOCUMENTS

| | | |
|---|---|---|
| 63-112432 | 5/1982 | Japan . |
| 63-136507 | 10/1987 | Japan . |

OTHER PUBLICATIONS

H. Bode, *Lead-Acid Batteries*, John Wiley and Sons (New York, 1977).
Transactions of the Faraday Society (1958) 54, 1370-1381.
Analytical Chemistry (1975) 47, 1352-1358.
Journal of Power Sources (1990) 31, 339-348.
Journal of the Electrochemical Society (1976) 123, 804-809.
Transactions of the Faraday Society, M. Fleischmann & H. R. Thirst, (1955) 51, 71-95.

*Primary Examiner*—William R. Dixon, Jr.
*Assistant Examiner*—Chris Gallo
*Attorney, Agent, or Firm*—Foley & Lardner

[57] ABSTRACT

A process for coating a solid substrate with a layer of barium metaplumbate includes steps of forming a layer of lead oxide on the substrate, if not already present, and then reacting this layer with a barium salt at an elevated temperature to form a layer of coating of barium metaplumbate. Reaction temperature is a key aspect of this process, along with use of a barium salt which will react at the temperature selected. In particular, the reaction temperature must be sufficiently high to allow the reaction to proceed, but lower than the melting point of the substrate. The described process eliminates the need to preform $BaPbO_3$ prior to coating and can be conducted at a much lower range of temperatures than prior processes.

14 Claims, 2 Drawing Sheets

PROCESS FOR FORMING BARIUM METAPLUMBATE

This is a continuation-in-part of application U.S. Ser. No. 07/345,993 filed May 2, 1989, pending.

TECHNICAL FIELD

This invention relates to a process for the synthesis of a barium salt, particularly to a process for coating a solid such as a lead-acid battery component with a layer of barium metaplumbate.

BACKGROUND OF THE INVENTION

Lead-acid battery failure can result from grid corrosion and separation of the active material from the plate, in particular the positive plate. This corrosion is due to self-discharge of the electrode, and to oxidationreduction reactions taking place between the plate and electrolyte during charging-discharging cycles. Lead oxides and sulfates formed as the grid corrodes are larger than lead, and result in creep or expansion of the grid. This is significant in battery manufacture, since grid growth is anticipated and provided for by leaving extra space in the casing.

Factors affecting battery life include the extent of contact between grid lead and lead dioxide, contact between plate and electrolyte, degree of plate porosity (greater porosity allows greater contact), and thickness of the grid. Generally, a lead-acid positive plate will serve about one year per ten mils of thickness. In order to extend battery life to about 20 to 30 years, a positive plate as thick as 0.31 inches has been used. This increases battery size as well as cost. A battery plate is needed which can resist self-discharge and corrosion in acid electrolyte, maintain adhesion of the active material, be manufactured economically, and diminish electrode size, but not strength or life. Such a plate would be especially suited for high power applications.

Barium metaplumbate is a metal oxide of perovskite structure commonly prepared at high temperatures of 650–1000° C. by reaction of $BaCO_3$, $BaCl_2$, $Ba(NO_3)_2$, $BaO_2$ or $BaO$ with $PbO$, $PbO_2$, or $Pb_3O_4$. Applications of metal oxide perovskites have focused on the superconductive properties of these compounds as described in Sleight, U.S. Pat. No. 3,932,315, issued Jan. 16, 1976 and Inagaki Japanese Patent Pub. 63-112432 (1988), which discloses compounds of the formula $MPbO_3$, wherein M is Zn, Mn or Cd. Applications in electrical components (Penneck et al., U.S. Pat. No. 4,470,898, issued Sep. 11, 1984) and as corrosion-resistant coatings (Tada U.S. Pat. No. 4,352,899, issued Oct. 5, 1982) have been described.

Barium metaplumbate has been used in semiconductors, capacitors, and resistors, as outlined in Nitta et al., U.S. Pat. No. 3,374,185, issued Mar. 19, 1968, Hiremuth, U.S. Pat. No. 4,761,711, issued Aug. 2, 1988, Japanese Patent pub. 63-136,507, and Chemical Abstracts 106:147845v, 109:65406a, 85:18563m, 79:46649c and 79:46650w. Barium metaplumbate synthesis using $Ba(OH)_2$ and $PbO$ at 1200 degrees to produce a powder has been reported in Chemical Abstracts 74:16428j. However, high temperature reactions for producing barium metaplumbate are energy intensive and preclude the possibility of forming a coating on a low-melting substrate such as lead.

The present invention provides an alternative process for synthesis of barium salts such as barium metaplumbate which can be carried out at a relatively low temperature, and which can thus be used to make lead-acid battery grids coated with barium metaplumbate to address the problems described above with lead-acid battery plates.

SUMMARY OF THE INVENTION

The invention provides a process for coating a solid substrate with a layer of barium metaplumbate by forming a layer of lead oxide on the substrate, if not already present, and then reacting this layer with a barium salt at an elevated temperature to form a layer of coating of barium metaplumbate. Reaction temperature is a key aspect of this process, along with using a barium salt which will react at the temperature selected. In particular, the reaction temperature must be sufficiently high to allow the reaction to proceed, but lower than the melting point of the substrate.

For lead-acid battery applications, the process of the invention can form a protective layer of barium metaplumbate on a variety of battery components. Barium metaplumbate is both electrically conductive and highly resistant to sulfuric acid. The coating is formed in situ, eliminating the need to preform the barium metaplumbate and then make up a formulation such as a paint for applying it to the component.

According to a further aspect of the invention, the process of the invention can be used to form an improved thin lead-acid battery positive electrode. In such an electrode, a thin layer of lead foil is covered with a layer of barium metaplumbate according to the invention, and is then further covered with an outer layer of active lead material, preferably an inner layer of alpha-lead dioxide and an outer layer of beta-lead dioxide. The coating process can be used to form a thin, bipolar electrode wherein a layer of negative active lead material is formed on the other side of the lead foil.

BRIEF DESCRIPTION OF THE DRAWINGS

The invention will be further described with reference to the accompanying drawings, wherein like numerals denote like elements, and.

DETAILED DESCRIPTION

Figure 1:
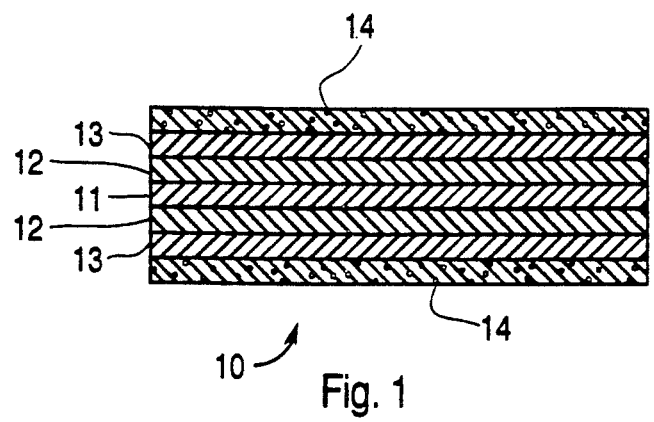
FIG. 1 is a cross-sectional view of a positive plate according to one embodiment of the invention.

According to the invention, a method for coating a substrate such as an electrode or battery component with barium metaplumbate ($BaPbO_3$) starts with forming a layer of a lead oxide on the surface of the substrate. The lead layer can be part of the substrate itself or a layer of lead deposited on another material as an underlying support, such as a conductive metal (e.g., copper, aluminum, steel, titanium, nickel) or a conductive ceramic (e.g., conductive titanium oxide, $TiO_2$, or tin oxide, $SnO_2$.) Conductive polymer substrates can be used if the temperature of the coating process is compatible with the melting point of the polymer. One conductive polymer which is stable at high temperatures (up to about 500° C.) is polypyrrole. A lead substrate coated with barium metaplumbate is preferred since it provides high conductivity, low cost, stability and good adhesion of the barium metaplumbate to the substrate.

The barium salt used in the process of the invention is preferably barium hydroxide, Ba(OH)$_2$, which is most commonly available in a hydrated form. This compound reacts with lead dioxide at 300° C., which is less than the melting point of lead (328° C.). Accordingly, if the substrate is lead or a lead alloy, a preferred reaction according to the invention is:

$$PbO_2 + Ba(OH)_2 \rightarrow BaPbO_3 + H_2O$$

preferably carried out at a temperature of 300 to 328° C. More generally, the reaction to produce barium metaplumbate takes place between a lead oxide and a barium salt. The lead oxide may be of any suitable reactive form, such as PbO, Pb$_3$O$_4$, or PbO$_2$ as illustrated above. If the substrate is higher-melting than lead, the barium salt can include compounds such as BaCO$_3$, BaCl$_2$, BaO$_2$, BaO and Ba(NO$_3$)$_2$, among others. Where the oxide is PbO$_2$, the reaction is preferably conducted in an oxygen atmosphere, e.g., under a continuous oxygen stream, in order to retard decomposition of the lead dioxide.

The reaction occurs in situ on the surface of the solid substrate. If the substrate is made of lead or a lead alloy, a surface layer of reactive lead dioxide may be formed electrochemically as a corrosion film according to the reaction:

$$Pb + 2H_2O \rightarrow PbO_2 + 4H^+ + 4e^-$$

Alternatively, a lead layer or substrate may be oxidized chemically by reacting the lead film with a strong oxidizing agent such as ozone, perborate, persulfate, or hydrogen peroxide to form lead dioxide. Persulfate reacts with lead monoxide and water to form lead dioxide. Reid U.S. Pat. No. 2,159,226, issued May 23, 1939, discloses the use of persulfate to improve the formation efficiency of lead battery plates. A hydrogen peroxide solution can be applied to the surfaces of battery plates by painting, dipping or spraying; see Orsino U.S. Pat. No. 2,658,097 issued Nov. 3, 1953. Ozone has been used to treat battery plates, as described in Mahato U.S. Pat. No. 4,656,706, issued Apr. 14, 1987.

The temperature of the reaction will vary depending on the melting points of the substrate and the salt. Temperatures in the range of 78° C., the melting point of barium hydroxide, up to the melting point of the substrate, can be used. However, temperatures in the range of 250° C. to the substrate melting point are preferred to improve the speed of the reaction. Reaction pressure is not critical. The reaction may be conducted under normal (atmospheric) or elevated pressure.

According to one embodiment of the invention, a multi-step process may be used to form a barium metaplumbate coating on a non-lead substrate. The substrate, such as copper, aluminum, etc., is first coated with lead by any conventional method, such as electroplating, vapor deposition, sputter coating, spray painting or dipping the substrate in molten lead. Then, the lead layer is converted to a lead oxide by one of the oxidation reactions described above. The lead oxide coating is then reacted with the barium salt to form barium metaplumbate in accordance with the invention. As an optional step, a further protective layer of lead or lead dioxide may be deposited over the barium metaplumbate by plating, sputter coating, etc. The protective layer helps prevent degradation of the barium metaplumbate layer.

Coatings of barium metaplumbate formed according to the invention may have any desired thickness, with thicknesses ranging from 1 to 25 $\mu$m being most commonly useful. Such a coating is dense and non-porous, i.e., does not permit the electrolyte to get through it, and is thus highly effective for protecting battery components such as electrodes, terminals, current collectors, spines, posts, strips, tabs, cast-on straps, intercell connectors, end plates, and other standard current-carrying components. Such components can be made of lead, copper, aluminum, and other conductive metals and alloys. Other items, such as lead weights, electrical wires, and industrial pipes, can also be protected using the process of the invention. Coatings formed according to the invention are generally useful in protecting lead and lead alloys from corrosive environments, other than marine environments.

In the context of the lead-acid battery, battery plates protected with a thin layer of barium metaplumbate according to the invention show a remarkable resistance to grid growth, as demonstrated in the examples below. Elimination of the extra space in the battery housing left to allow for grid expansion allows more grids to be used in the same housing space, effectively increasing the power capacity of the battery by as much as 85% or more. This additional capacity is particularly important for stand-by service batteries that are used at low levels but are expected to last long periods of time, such as batteries used for safety lights and power tools.

Electrodes coated according to the invention can be used in electrochemical apparatus in processes such as chlorination, organic synthesis, and ozone generation. Such electrodes having a dense barium metaplumbate coating according to the invention have better electrical conductivity and mechanical strength than polymeric electrodes wherein barium metaplumbate particles are dispersed in the plastic, as described in the above cited parent application, Ser. No. 07/345,993, the entire contents of which are incorporated by reference herein. The process of the invention simplifies BaPbO$_3$ synthesis because the reactants used allow low production temperatures, facilitate use of a low cost substrate such as lead, and form the coating and the metaplumbate compound at the same time, eliminating the need to pre-form the metaplumbate.

According to a further aspect of the invention, barium metaplumbate coatings can be formed on thin lead sheets to provide improved thin monopolar and bipolar electrodes. Major failure modes for lead-acid batteries include self-discharge of the positive electrode and grid growth and corrosion. When a thin layer of lead dioxide is formed on a lead sheet or grid by a Planté process, pasting or electrodeposition, the rate of self-discharge of the electrode is very high, about 1 order of magnitude higher than for a typical porous pasted electrode. This renders the shelf life of the electrode too short to be of practical use. A lead substrate coated with a thin film of lead dioxide has a shelf life of about 8 hours at 49° C., while a lead-acid cell with pasted electrodes has a shelf life of about 100 days at 45° C. and 50 days at 55° C. Self discharge is due to the reactions:

$$PbO_2 + Pb + 2H_2SO_4 = 2PbSO_4 + 2H_2O$$

$$PbO_2 + Pb = 2PbO$$

which occur at the interface between the lead substrate and the $PbO_2$ active material. The products formed by these reactions resist electrochemical conversion on charge and cause a permanent loss in battery capacity.

Referring now to FIG. 1, a self discharge-resistant electrode 10 of the invention comprises a conductive substrate 11, such as lead foil, another metal, or a conductive ceramic or plastic, coated on both sides with thin layers of barium metaplumbate 12, then with dense layers of alpha-lead dioxide 13, and last with layers of a porous beta-lead dioxide active material 14. This eliminates the interface between the lead and lead dioxide so that the self-discharge reaction cannot occur and thus extends shelf life. It is possible to coat the barium metaplumbate with lead, if the lead is converted to lead dioxide during the formation process, as an alternative to directly coating the electrode with lead dioxide. As noted above, such a lead coating may be used to protect the barium metaplumbate material, and to prevent contamination of the active lead dioxide material with barium sulfate.

Figure 2:
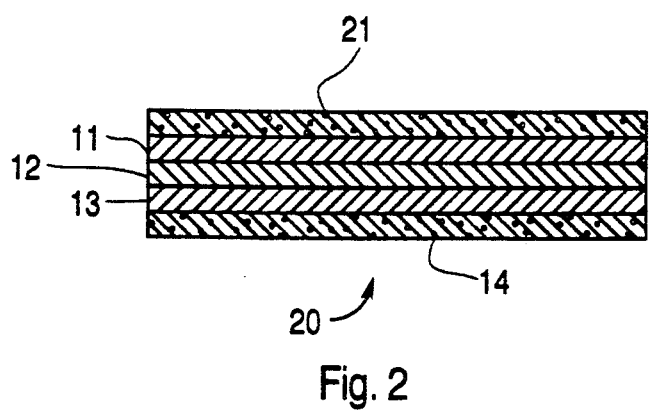
FIG. 2 is a cross-sectional view of a bipolar electrode according to another embodiment of the invention.

Referring to FIG. 2, a bipolar positive electrode 20 according to the invention has, on one side, the same successive layers as used for a monopolar plate. On its other side, however, bipolar electrode 20 has a layer of negative lead active material 21 prepared by methods well known in the art.

Methods of coating the alpha-lead dioxide layer with beta-lead dioxide active material include direct electrochemical deposition of the beta-lead dioxide from a solution of soluble lead, and other known commercial processes. The latter include formation by the Planté process of a layer of lead which can be deposited on the lead dioxide as described above, as well as application and formation by the Fauré process of a layer of lead oxide paste. These processes are extensively described in the literature. See, for example, H. Bode, *Lead-Acid Batteries*, John Wiley and Sons (New York, 1977).

Two methods of coating the barium metaplumbate with a thin layer of lead dioxide ($PbO_2$) include chemical deposition and direct electrodeposition of the $PbO_2$ or deposition of lead or a lead (II) salt or oxide such as lead sulfate, followed by oxidation of the material to form either alpha or beta lead dioxide, depending on the conditions. Lead deposited on the barium metaplumbate can be oxidized to beta-lead dioxide during the Fauré formation process, in which a lead oxide paste is electrochemically converted to lead dioxide.

In electrodeposition of alpha- and beta-lead dioxide as well as mixtures of these two polymorphs, any lead dioxide deposit which is adherent and non-porous is acceptable. However, alpha-lead dioxide deposits are very dense and non-porous and may be preferred over beta-lead dioxide films, which tend to be more porous. See *Trans. Faraday Society* (1958) 54, 1370–1381, *Electrochimica Acta* (1959)1, 146–160, (1967) 12, 967–982, and (1960)2, 22–49, *Analytical Chemistry* (1975) 47, 1352–1358, *Journal of Power Sources* (1990) 31, 339–348 and *Journal of the Electrochemical Society* (1976) 123, 804–809, reporting methods for the electrodeposition of alpha and beta lead dioxides on various substrates.

Oxidation of lead (II) compounds such as lead sulfate or lead oxide is another method for forming a lead dioxide layer on the barium metaplumbate. A layer of lead may be plated onto the barium metaplumbate, using for example a commercial lead fluoroboric acid bath. This layer may then be converted to a lead oxide or a lead sulfate by oxidation of the layer, i.e. by electrochemical corrosion as discussed above. The electrooxidation of lead (II) compounds such as lead oxide and lead sulfate to lead dioxide is well known. See M. Fleischmann and H.R. Thirsk, *Transactions of the Faraday Society* (1955) 51, 71–95.

Application of a $BaPbO_3$ layer over a lead covered substrate, particularly used as a positive lead-acid battery plate, gives increased life to the battery by separating the lead from the lead dioxide active material and minimizing the self-discharge reaction. This in turn decreases grid growth and corrosion, and allows use of thinner electrode grids. A thin plate, e.g. 0.025 inch thick or less, lowers production costs and allows production of smaller batteries having improved energy density. The alpha-lead dioxide layer protects the $BaPbO_3$ coating, improves conductivity and resists corrosion due to its non-porous nature. The beta-lead dioxide layer provides a surface for the battery reaction to occur free from the effects of the self-discharge reaction.

A mathematical lead-acid model was used to examine the performance of a thin coated positive electrode according to the invention against an electrode of conventional thickness. The model performs calculations using the physical data of each battery component input by users to simulate battery reactions during discharge and to predict battery capacity. According to the model, thin positive plates with reductions of 25% in grid thickness, 8% paste and 25% acid performed with less than 3% penalty in battery capacity. An improvement in energy density of 16.7% is gained by reducing battery weight by the same amount. The parameters for the simulation were as follows:

TABLE 1

|  | Standard Design | Modified Design |
|---|---|---|
| Positive Plates: | | |
| Number of plates | 11 | 11 |
| Total grid weight/lb | 52.38 | 39.29 |
| Total paste weight/lb | 52.38 | 46.78 |
| Place thickness | 0.310" | 0.260" |
| Overpasting | 0.015"* | 0.018"** |
| Negative Plates: | | |
| Plate number | 12 | 12 |
| Total grid weight/lb | 34.92 | 26.19 |
| Total paste weight/lb | 45.63 | 43.35 |
| Plate thickness | 0.190" | 0.167" |
| Overpasting* | 0.010" | 0.020" |
| Acid: | | |
| Gravity @ 77° F. | 1.215 | 1.215 |
| Weight/lb | 84.0 | 63.0 |
| Performance: | | |
| Time (min) to 1.75 V | | |
| 950 Amp (30 min. rate) | 40.0 | 39.2 |
| 210 Amp (8 hour rate) | 367 | 357 |
| Energy density in Wh/kg | | |
| 950 Amp | 8.48 | 9.94 |
| 210 Amp | 18.09 | 21.12 |

*Assuming 75% grid opening
**Assuming 80% grid opening

Substantially the same results would be expected if batteries having the foregoing characteristics were constructed and tested.

Examples of the invention follow.

EXAMPLE 1

Electroplating of lead, forming the $PbO_2$ layer, and synthesis and coating of $BaPbO_3$ were carried out as follows. A plating sample and pure lead counter electrode were placed in a commercial fluoroboric acid plating solution. Constant negative current density of about 1 $mA/cm^2$ was applied to the sample, producing a plating rate of about 3.41 $\mu m/hr$. Plating time was controlled to obtain the desired thickness of lead coating. Upon completion of plating, the sample was removed, rinsed with deionized water and air dried.

A lead spiral wire counter electrode and the lead plated substrate (alternatively, a lead grid) were placed in a sulfuric acid solution having a concentration which was varied in the range of 5 mM to 10 M. A constant positive current density of about 1 $mA/cm^2$ was applied to the sample for 3 to 4 hours. This converted the surface lead metal to a lead dioxide layer with a thickness of about 10 $\mu m$. The sample was rinsed with deionized water then air dried.

$Ba(OH)_2 \cdot 8H_2O$ was ground to 325 mesh and smeared to cover the entire surface of the $PbO_2$-coated samples. (The samples could alternatively be dipped into molten $Ba(OH)_2 \cdot 8H_2O$. However, barium hydroxide is very sensitive to carbon dioxide, will easily convert in air to barium carbonate, and then precipitate.) The sample was then placed in a retort under a stream of oxygen with a flow rate of about 20 to 50 cc/minute. A water seal was created by connecting the retort outlet to a water bath. The retort was heated to 300° C. at a rate of about 4.5 degrees/min., held at 300° C. for at least 8 hours, then cooled to room temperature in 3 hours. The treated samples were removed, soaked in 10% $NH_4Cl$ aqueous solution for about 2 minutes, washed under running water to remove unreacted residue, and air dried.

EXAMPLE 2

Improved batteries according to the invention were tested against a control for first reserve and cold crank capacity, accelerated float life, and performance. Lead grids containing 0.08% to 0.11% calcium, 0.2% to 0.45% tin, 0.02 to 0.04% aluminum, and other trace metals such as bismuth, silver, cobalt, etc., were coated with a layer of $BaPbO_3$ according to the procedure of Example 1. The $BaPbO_3$ coated grids were further plated with a layer of lead metal, about 10 $\mu m$ thick, according to the plating procedure described in Example 1. An uncoated grid was used as a control.

Conventional positive active material was pasted tot eh grids and cured. Four positive plates, sandwiched by five conventional negative plates with polypropylene separators between each pair, were placed in a plastic case. Sulfuric acid having a specific gravity of 1.245 was added to complete a battery. The battery was formed by passing a constant charge of 165 Ah/lb. positive active material through the battery for 8 hours.

To determine first reserve and cold crank capacity, the battery was discharged by passing a constant current of 2.32 A at two hour rate until the battery voltage reached 1.75 V cut-off. Discharge time was recorded and reserve capacity calculated by multiplying current with discharge time and normalizing to the weight of positive active material. The battery was recharged with a constant current in two hours to prepare for accelerated float life tests. Current was adjusted until total charge put back equaled 110% of the discharge capacity. Results of the test, given in Table 2 below, reveal that invention battery performance is equal or superior to the control.

TABLE 2

|  | Reserve Capacity: | | Cold Crank |
|---|---|---|---|
|  | Time/Min. | Ah/lb. | Time/sec. |
| Control | 106.3 | 46.29 | 25.1 |
| Invention | 106.2 | 46.61 | 35.9 |

Accelerated float life tests were then performed. The grid thickness used in this test was 55 mil. Based on an expected life of one year per 10 mils thickness, this grid should serve 5.5 years, the equivalent of surviving 18 weeks in the 60° C. accelerated life test. The test batteries were wired in parallel and placed in a water bath at 60° C. A constant voltage of 2.3 V was applied and current allowed to float. Every two weeks, the batteries were disconnected, removed form the water bath, cooled in air for 1 hour, and the reserve capacity measured. The batteries were recharged to 110% capacity then replaced into the water bath.

Figure 4:
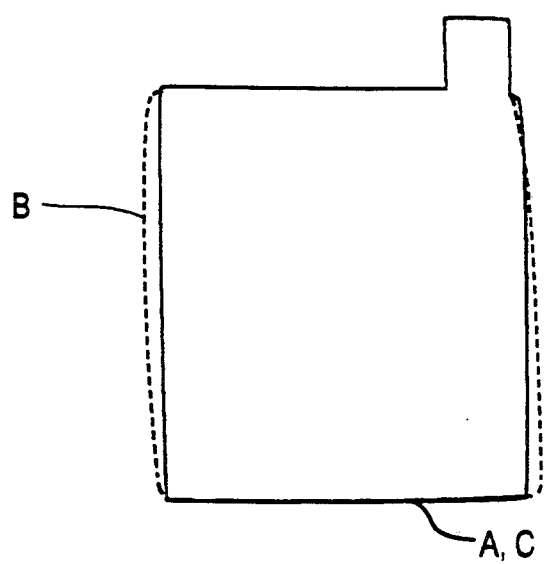
FIG. 4 is a diagram of grid growth following an accelerated life test for a control versus an electrode grid coated according to the invention.
Figure 3:
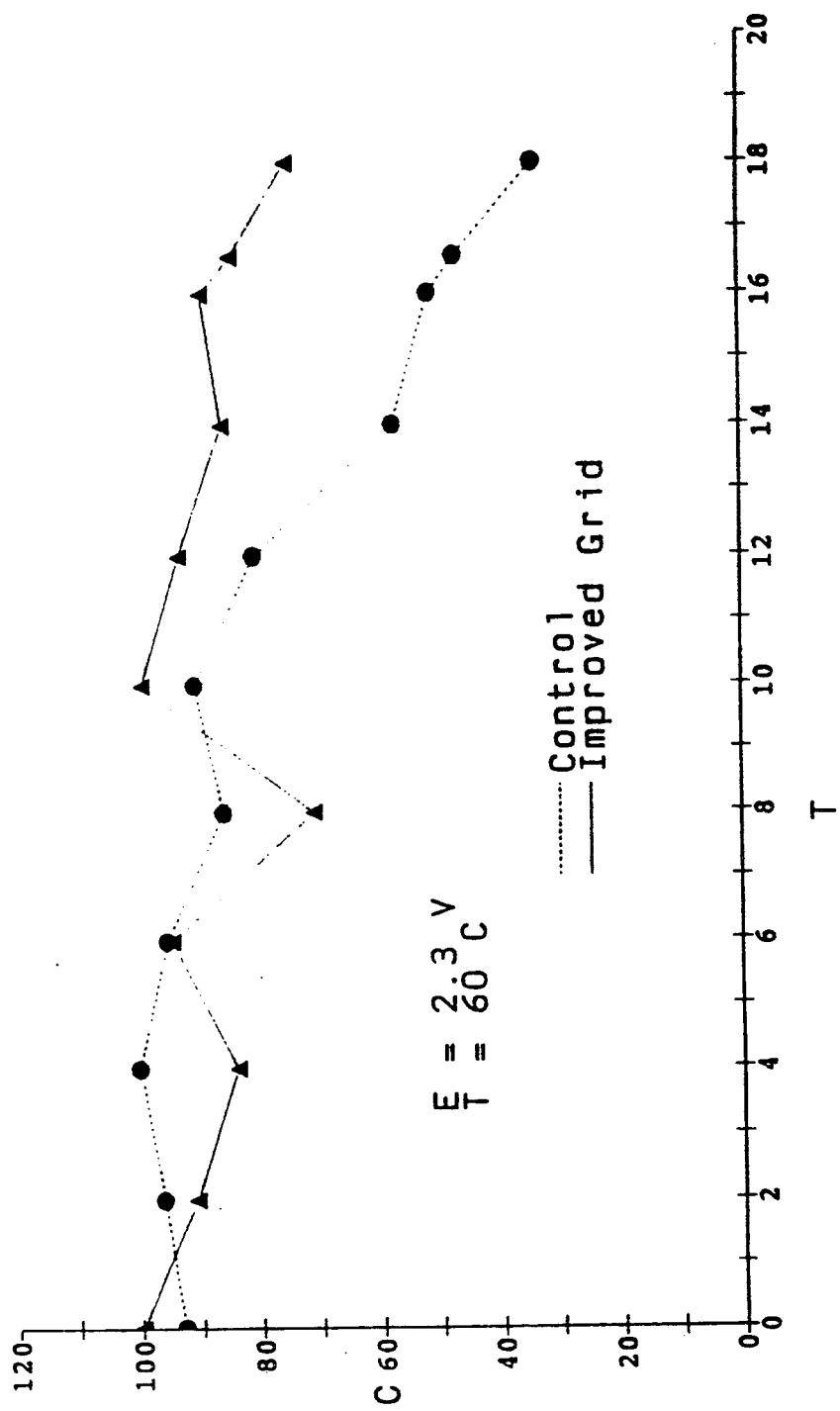
FIG. 3 is a graph showing results of an accelerated life test plotting percent highest capacity against time in weeks for a control (circles) versus an electrode grid coated according to the invention (triangles)

Reserve capacity as a function of time, normalized to the best reserve capacity during the test, is shown in FIG. 3. After 18 weeks or 5.5 service years, coated battery grids retained 75% capacity while control grids retained only 33% capacity. Grid growth at this point is shown in FIG. 4, wherein A shows the outline of the starting grids, B represents the control grid according to the invention after 18 weeks. The control grid exhibited 15% expansion while the coated grid showed no noticeable expansion.

It will be understood that the foregoing description is of preferred exemplary embodiments of the invention, and that the invention is not limited to the specific forms shown. Modifications may be made in the design and arrangement of the elements without departing form the scope of the invention as expressed in the appended claims.

We claim:

1. A process for coating a solid substrate with a layer of barium metaplumbate, comprising:
   (a) forming a layer of lead oxide on the surface of the substrate; and
   (b) reacting the lead oxide layer with a barium salt at an elevated temperature high enough to allow the reaction to proceed but less than the melting point of the substrate under conditions effective to form the barium metaplumbate coating.

2. The process of claim 1, wherein the substrate comprises a lead alloy, and step (a) further comprises oxidizing the surface of the substrate.

3. The process of claim 1, further comprising a step (c) of covering the barium metaplumbate layer with a protective metal layer.

4. The process of claim 3, wherein the protective layer consists essentially of lead of lead oxide.

5. The process of claim 1, wherein the substrate is other than lead of a lead alloy, and step (a) further comprises coating the substrate with lead, and oxidizing the lead coating to form lead oxide.

6. The process of claim 1, wherein the lead oxide is selected from the group consisting of PbO, $Pb_3O_4$, or $PbO_2$.

7. The process of claim 6, wherein the barium salt is selected form the group consisting of $Ba(OH)_2$, $BaCO_3$, $BaCl_2$, $BaO_2$, $BaO$ and $Ba(NO)_2$.

8. The process of claim 2, wherein the lead oxide is $PbO_2$ and the barium salt is $Ba(OH)_2$.

9. The process of claim 2, wherein the substrate is a lead-acid battery component selected from a terminal, current collector, spine, post, strip, tab, cast-on strap, intercell connector, and end plate.

10. A process for the synthesis of barium metaplumbate, which comprises reacting a lead dioxide with barium hydroxide at a temperature in the range of about 300° to 328° C. under conditions effective to form barium metaplumbate.

11. A positive electrode for the lead-acid battery comprising:
    a grid made of lead or a lead alloy; and
    a non-porous protective layer consisting essentially of barium metaplumbate covering said grid;
    a non-porous layer of $PbO_2$ deposited on said protective layer; and
    a porous layer of active $PbO_2$ deposited on said layer of non-porous $PbO_2$.

12. The electrode of claim 11, wherein said non-porous layer consists essentially of alpha-$PbP_2$ and said porous layer consists essentially of beta-$PbO_2$.

13. A bipolar electrode for use in a lead-acid battery, comprising:
    a lead or lead alloy substrate;
    a layer of a negative active lead material deposited on one side of the substrate;
    a protective layer of barium metaplumbate covering the side of the substrate opposite the negative material layer;
    a non-porous layer of $PbO_2$ deposited on said protective layer; and
    a porous layer of active $PbO_2$ deposited on said layer of non-porous $PbO_2$.

14. The bipolar electrode of claim 13, wherein said non-porous layer consists essentially of alpha-$pbO_2$ and said porous layer consists essentially of beta-$PbO_2$.

* * * * *